US012291912B2

(12) United States Patent
Patel et al.

(10) Patent No.: US 12,291,912 B2
(45) **Date of Patent: *May 6, 2025**

(54) DOOR SYSTEM HAVING A SWING INTERLOCK SYSTEM

(71) Applicant: Allegion Access Technologies LLC, Carmel, IN (US)

(72) Inventors: Vinay N. Patel, Berlin, CT (US); Thomas M. Kowalczyk, Unionville, CT (US); Ronald Laliberte, Farmington, CT (US); James Cavanaugh, Farmington, CT (US)

(73) Assignee: Allegion Access Technologies LLC, Carmel, IN (US)

( * ) Notice: Subject to any disclaimer, the term of this patent is extended or adjusted under 35 U.S.C. 154(b) by 146 days.

This patent is subject to a terminal disclaimer.

(21) Appl. No.: 18/097,920

(22) Filed: Jan. 17, 2023

(65) Prior Publication Data

US 2023/0392426 A1 Dec. 7, 2023

Related U.S. Application Data

(63) Continuation of application No. 16/468,219, filed as application No. PCT/US2017/065357 on Dec. 8, 2017, now Pat. No. 11,555,344.

(Continued)

(51) Int. Cl.

| | |
|---|---|
| ***E05D 15/58*** | (2006.01) |
| ***E05C 19/16*** | (2006.01) |
| ***E06B 3/50*** | (2006.01) |

(52) U.S. Cl.

CPC .............. *E05D 15/58* (2013.01); *E05C 19/16* (2013.01); *E06B 3/509* (2013.01); *E05Y 2900/132* (2013.01)

(58) Field of Classification Search

CPC .......................... E05D 15/58; E05D 2015/585

See application file for complete search history.

(56) References Cited

U.S. PATENT DOCUMENTS

| | | | | |
|---|---|---|---|---|
| 704,887 A * | 7/1902 | Low | E05F 15/638 | 49/66 |
| 1,085,065 A * | 1/1914 | Speicher | E06B 3/50 | 49/257 |

(Continued)

FOREIGN PATENT DOCUMENTS

| | | | | |
|---|---|---|---|---|
| DE | 102009027242 A1 * | 12/2010 | E04B 2/827 |
| EP | 2639391 A1 * | 9/2013 | E05D 15/0604 |
| WO | WO-2015065264 A1 * | 5/2015 | E05D 15/58 |

OTHER PUBLICATIONS

Canadian Office Action; Canadian Intellectual Property Office; Canadian Patent Application No. 3,046,525; May 8, 2024; 4 pages.

(Continued)

*Primary Examiner* — Catherine A Kelly

(74) *Attorney, Agent, or Firm* — Taft Stettinius & Hollister LLP

(57) ABSTRACT

A door system includes a header having a guide rail that has a central portion having a notch. A panel hanger is slidably coupled to the header. A door panel has a handle end portion releasably coupled to the panel hanger and a pivot end portion pivotably coupled to the panel hanger. The panel hanger and the door panel slide in unison between a closed position and a fully open position along a longitudinal plane. An interlock plate is positioned to extend upwardly from the door panel, and has a downwardly extending guide slot that slidably receives the guide rail of the header. When the door panel is in the fully open position, the interlock plate is aligned with the notch of the guide rail of the header in a (Continued)

direction orthogonal to the longitudinal plane to facilitate a pivoting of the door panel away from the longitudinal plane.

22 Claims, 9 Drawing Sheets

Related U.S. Application Data

(60) Provisional application No. 62/486,317, filed on Apr. 17, 2017, provisional application No. 62/432,371, filed on Dec. 9, 2016.

(56) References Cited

U.S. PATENT DOCUMENTS

| | | | | |
|---|---|---|---|---|
| 4,503,637 | A * | 3/1985 | Parente | E06B 3/5072 49/411 |
| 4,619,074 | A * | 10/1986 | Leung | E05D 15/58 49/165 |
| 5,394,648 | A * | 3/1995 | Kordes | E05C 5/04 49/177 |
| 5,486,026 | A * | 1/1996 | Borgardt | E05B 65/0876 49/141 |
| 5,832,980 | A * | 11/1998 | Cianciolo | E05D 15/58 160/197 |
| 6,061,961 | A * | 5/2000 | Rupe | E06B 9/52 49/164 |
| 6,422,287 | B1 * | 7/2002 | Wilke | E05D 15/58 160/195 |
| 6,526,695 | B1 * | 3/2003 | Nguyen | E05D 15/58 49/260 |
| 7,451,802 | B2 * | 11/2008 | Cianciolo | E05D 15/58 160/225 |
| 7,861,475 | B2 * | 1/2011 | Sprague | E05B 65/0085 52/64 |
| 7,950,439 | B2 * | 5/2011 | Anderson | E05D 15/58 160/195 |
| 8,065,779 | B2 * | 11/2011 | Kuchas | E05D 15/58 16/81 |
| 8,096,342 | B2 * | 1/2012 | Scruggs | E05D 15/08 160/218 |
| 8,443,549 | B2 * | 5/2013 | Salvietti | E05D 15/48 49/141 |
| 8,448,997 | B2 * | 5/2013 | Laliberte | E05B 63/0069 49/394 |
| 8,627,604 | B2 * | 1/2014 | Seymour | E06B 3/922 49/141 |
| 8,756,864 | B2 * | 6/2014 | Hamaker | E05D 15/48 49/168 |
| 8,756,865 | B2 * | 6/2014 | Nicholson | E05D 15/48 49/180 |
| 8,826,598 | B2 * | 9/2014 | Ranaudo | E06B 3/5072 49/506 |
| 9,016,762 | B2 * | 4/2015 | Ojima | B60J 5/047 701/49 |
| 9,487,985 | B2 * | 11/2016 | Conley | E06B 3/509 |
| 10,119,315 | B2 * | 11/2018 | Schneider | E05D 15/58 |
| 10,407,960 | B2 * | 9/2019 | Wolfe | E05B 65/0085 |
| 10,472,872 | B2 * | 11/2019 | Ingram | E05D 15/58 |
| 2006/0108079 | A1 * | 5/2006 | Burggraaf | E05D 15/1013 160/206 |
| 2019/0309538 | A1 * | 10/2019 | Patel | E05C 3/167 |

OTHER PUBLICATIONS

Canadian Examination Report; Canadian Intellectual Property Office; Canadian Application No. 3,046,525; Jan. 28, 2025; 4 pages.

* cited by examiner

DOOR SYSTEM HAVING A SWING INTERLOCK SYSTEM

CROSS-REFERENCE TO RELATED APPLICATIONS

This application is a continuation of U.S. patent application Ser. No. 16/468,219 filed Jun. 10, 2019 and issued as U.S. Pat. No. 11,555,344, which is a U.S. national stage application from International PCT Application No. PCT/US2017/065357 filed Dec. 8, 2017, which claims the benefit of U.S. Provisional Application No. 62/486,317 filed Apr. 17, 2017, and which also claims the benefit of U.S. Provisional Application No. 62/432,371 filed Dec. 9, 2016, the contents of each application incorporated herein by reference in their entirety.

TECHNICAL FIELD

The present invention relates to a door system having at least one slidable and pivotable door panel, such as a sliding and swinging health care or intensive care unit/critical care unit (ICU/CCU) door.

BACKGROUND ART

Entry doors for hospital ICU/CCU rooms are typically equipped with doors which have the ability to both slide closed, and under emergency circumstances or for convenience, swing open to provide greater access to the ICU/CCU room. Previously, the ICU/CCU rooms were equipped with manual sliding doors that provided for full access into or out of the room through the breakaway provision of the sliding door with the sliding door in any position.

What is needed is a door system that may be used in a health care or ICU/CCU environment, which enables the door panel to slide, and can allow the door panel to swing in limited circumstances.

SUMMARY OF INVENTION

One aspect to the door system of the present invention is that of preventing swingout of a slidable/pivotable door panel unless the door panel is slid to the fully open position.

Another aspect of the door system of the present invention is that of slide prevention, which keeps the door panel that is swung out from sliding. This aspect makes the entire door system much stiffer, i.e., helps prevent the door panel from sagging, when broken out.

Another aspect of the door system of the present invention is that of providing automatic positioning of the pivotable/slidable door panel in the horizontal and vertical positions when the door panel is swung closed.

Another aspect of the door system of the present invention is that of a push button unlatching/auto re-latching, which provides an easy and intuitive way for the door panel to be unlatched and swung out once the door panel is slid fully open, such that only one motion is required to both unlatch and swing the door panel open. Also, upon returning the door panel hack to the swung closed position, the latching system automatically re-latches the door panel.

In accordance with one or more of the aspects set forth above, the invention in one form is directed to a door system that includes a door frame, a panel hanger member, and a door panel. The door frame includes a header member having a guide rail. The guide rail has a front surface, a rear surface, and a lower terminal edge, the guide rail having a central portion that has a notch that extends upwardly from the lower terminal edge between the front surface and the rear surface. A panel hanger member is slidably coupled to the header member. The door panel is coupled to the panel hanger member, with the door panel having a handle end portion releasably coupled to the panel hanger member and a pivot end portion pivotably coupled to the panel hanger member. The panel hanger member and the door panel are configured to slide in unison between a closed position and a fully open position along a longitudinal plane. An interlock plate is fixedly mounted to the handle end portion of the door panel and is positioned to extend upwardly from the door panel. The interlock plate includes a downwardly extending guide slot configured to slidably receive the guide rail of the header member, wherein when the door panel is in the fully open position, the interlock plate is aligned with the notch of the guide rail of the header member in a direction orthogonal to the longitudinal plane to facilitate a pivoting of the door panel relative to the panel hanger member away from the longitudinal plane.

The invention in another form may include an interlock block assembly connected to an end portion of the panel hanger member. The interlock block assembly includes a base block, a rotational member, and a biasing member. The rotational member is pivotably coupled to the base block at a pivot axis, with the pivot axis being substantially parallel to the longitudinal plane. The rotational member is configured to rotate between a slide blocking position and a slide release position. The biasing member is configured to bias the rotational member toward the slide blocking position, wherein when the door panel is in the fully open position, the rotational member is aligned with the notch of the guide rail of the header member in a direction orthogonal to the longitudinal plane to facilitate a blocking of the sliding of the panel hanger member and the door panel relative to the header member along the longitudinal plane. The rotational member of the interlock block assembly rotates to the slide blocking position and into the notch of the guide rail of the header member to prevent a sliding of the panel hanger member and the door panel relative to the header member as the door panel is pivoted away from the longitudinal plane.

The invention in another form may include a latch assembly mounted to the door panel. The latch assembly may include an actuator, a linkage, and a latch bolt. The linkage is operably coupled between the actuator and the latch bolt. The latch bolt is positioned to move along a substantially vertical axis. The base block of the interlock block assembly has a bottom surface, and has a hole that extends upwardly at the bottom surface to receive the latch bolt when the door panel is in the home position. The actuator is operable to move the latch bolt between a retracted position and an extended position, and wherein when the door panel is in the home position and the bolt is in the extended position, the latch bolt is engaged with the hole of the base block of the interlock block assembly to prevent the door panel from pivoting relative to the panel hanger member away from the home position.

The invention in another form may include the latch bolt having a beveled surface that engages a strike plate attached to the base block of the interlock block assembly as the door panel is pivoted toward the home position so as to automatically depress the latch bolt to facilitate a return-pivoting of the door panel to the home position, and wherein a biasing spring moves the latch bolt toward the extended position to engage the hole in the base block of the interlock block assembly when the door panel reaches the home position.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, and such exemplifications are not to be construed as limiting the scope of the invention in any manner.

DESCRIPTION OF EMBODIMENTS

Figure 1:
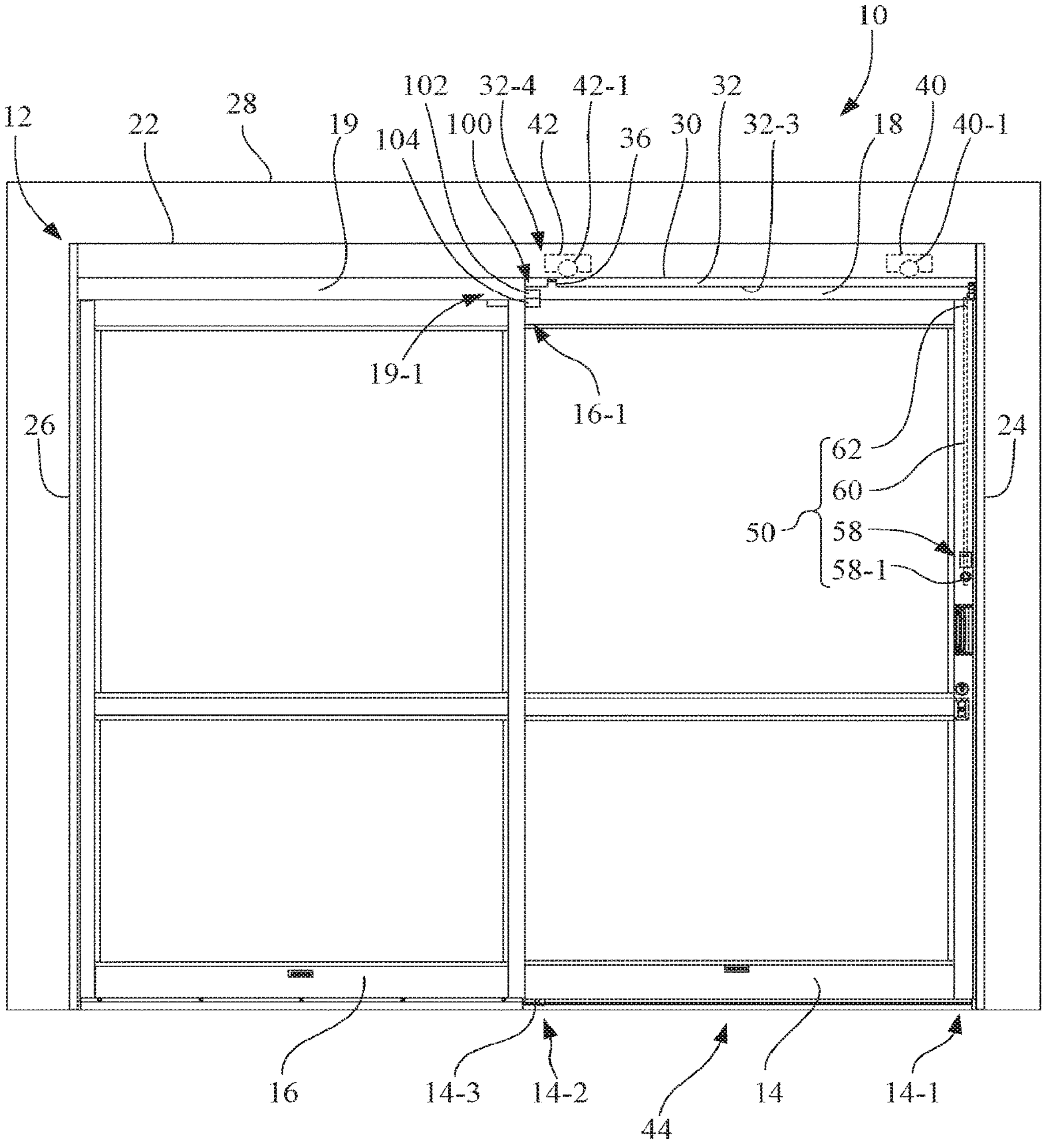
FIG. 1 is an exterior side view of a door system having a selectively pivotable and slidable door panel, with the door panel in the closed position.

Referring now to the drawings, and more particularly to FIGS. 1-4, there is shown a door system 10 having a door frame 12, a door panel 14, a door panel 16, a panel hanger member 18, a panel hanger member 19, and a swing interlock system 20. Door system 10 incorporating door panel 14 and door panel 16 provides visibility access into and out of a room. In the present embodiment, one door panel, i.e., door panel 14, is telescopic, i.e., slidable, to allow a greater clear door opening for a given rough opening, thereby providing flexible access to overall and individual patient areas. Door system 10 includes trackless threshold features, thereby minimizing access obstacles. Door system 10 is further configured such that door panel 14 and door panel 16 may be allowed to breakout (i.e., to be swung open) under certain circumstances. Door system 10 may also include seals to provide smoke and draft controls.

Figure 2:
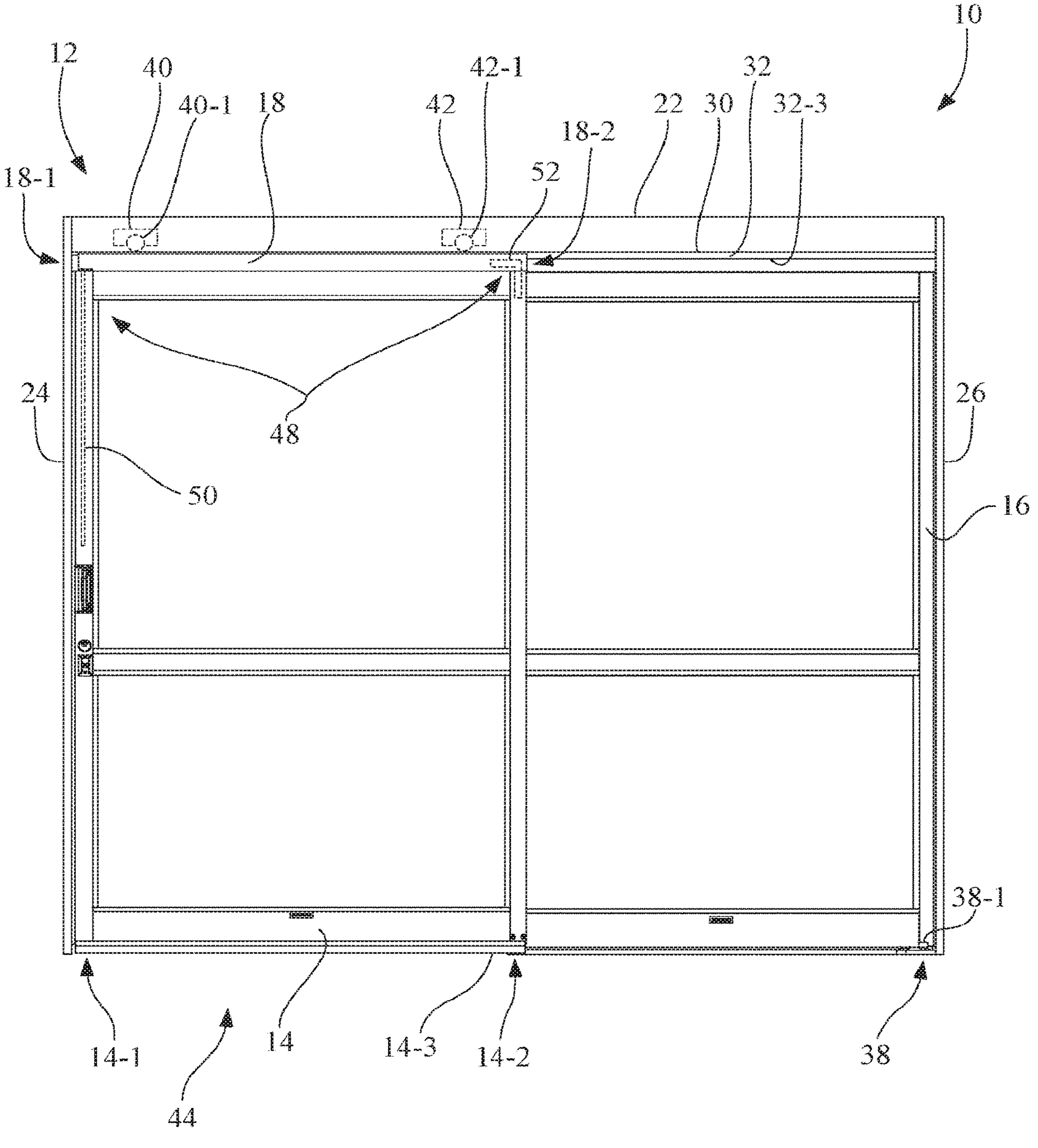
FIG. 2 is an interior side view of the door system of FIG. 1, with the door panel in the closed position.

Referring to FIGS. 1 and 2, door frame 12 includes a header member 22, a jamb member 24, and a jamb member 26. Jamb member 26 is spaced from jamb member 24, with header member 22 extending between jamb member 24 and jamb member 26. Jamb member 24, jamb member 26, and header member 22 are interconnected, e.g., by mechanical fasteners, such as screws or bolts, to form an upside down U-shaped structure that defines a longitudinal plane 28.

Panel hanger member 19 is fixedly attached to door frame 12, e.g., mechanical fasteners. Door panel 16 is fixedly located to be adjacent jamb member 26, and is connected to door frame 12 via panel hanger member 19 in a manner such that door panel 16 is prevented from sliding movement relative to door frame 12 in all circumstances. In one implementation, for example, door panel 16 may be attached to door frame 12 and panel hanger member 19 by hinges, e.g., pivot pins, as is known in the art, thus preventing sliding movement relative to door frame 12 while allowing door panel 16 to swing relative to door frame 12 when door panel 14 is unlatched from panel hanger member 18. In some cases, for example, hospital staff may want to swing door panel 14 and door panel 16 together to allow for more of a clearer door opening to facilitate movement of equipment into or out of the room.

Figure 4:
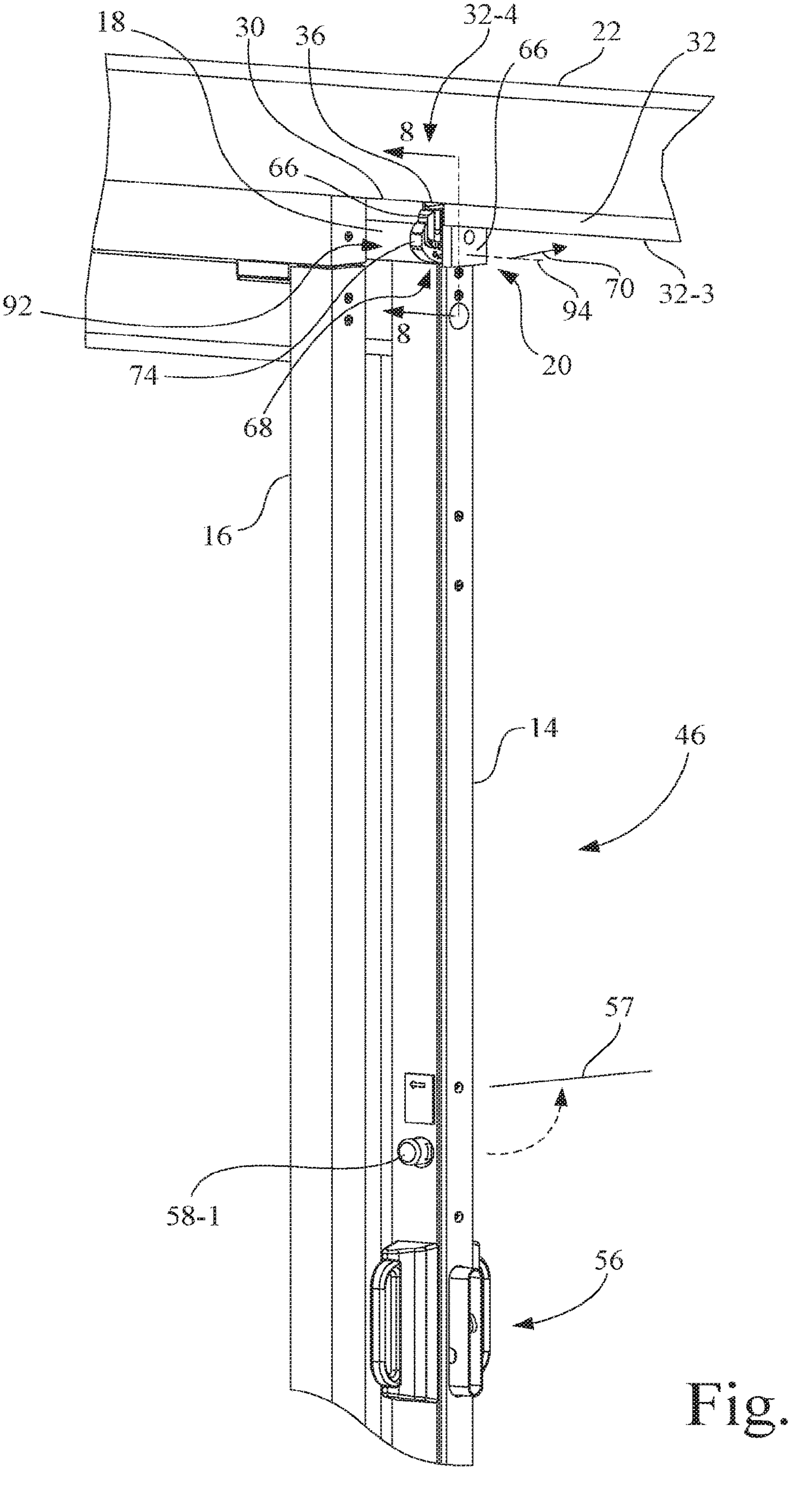
FIG. 4 is an enlarged exterior perspective view of a portion of the door system arranged as depicted in FIG. 3, with the door panel in the fully open position, and depicting a portion of a swing interlock system.
Figure 8:
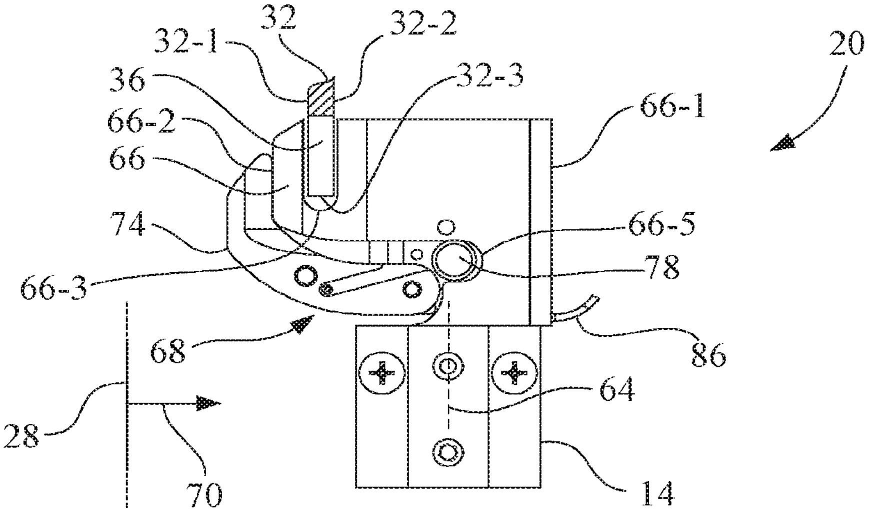
FIG. 8 is a section end view of a portion of the swing interlock system of FIG. 4 taken along line 8-8, depicting the interlock plate engaged with the interlock block assembly to position a rotating member of the interlock block assembly in the slide release position.

Header member 22 includes an elongate support rail 30 and an elongate guide rail 32 arranged in an elongate L-shaped configuration. Referring also to FIGS. 4 and 8, guide rail 32 has a front surface 32-1, a rear surface 32-2, and a lower terminal edge 32-3. In accordance with an aspect of the present invention, referring again to FIGS. 1 and 4, guide rail 32 has a central portion 32-4 that has a notch 36 that extends upwardly from the lower terminal edge 32-3 between front surface 32-1 and rear surface 32-2. As will be better understood from the description further below, notch 36 is a portion of swing interlock system 20.

Figure 5:
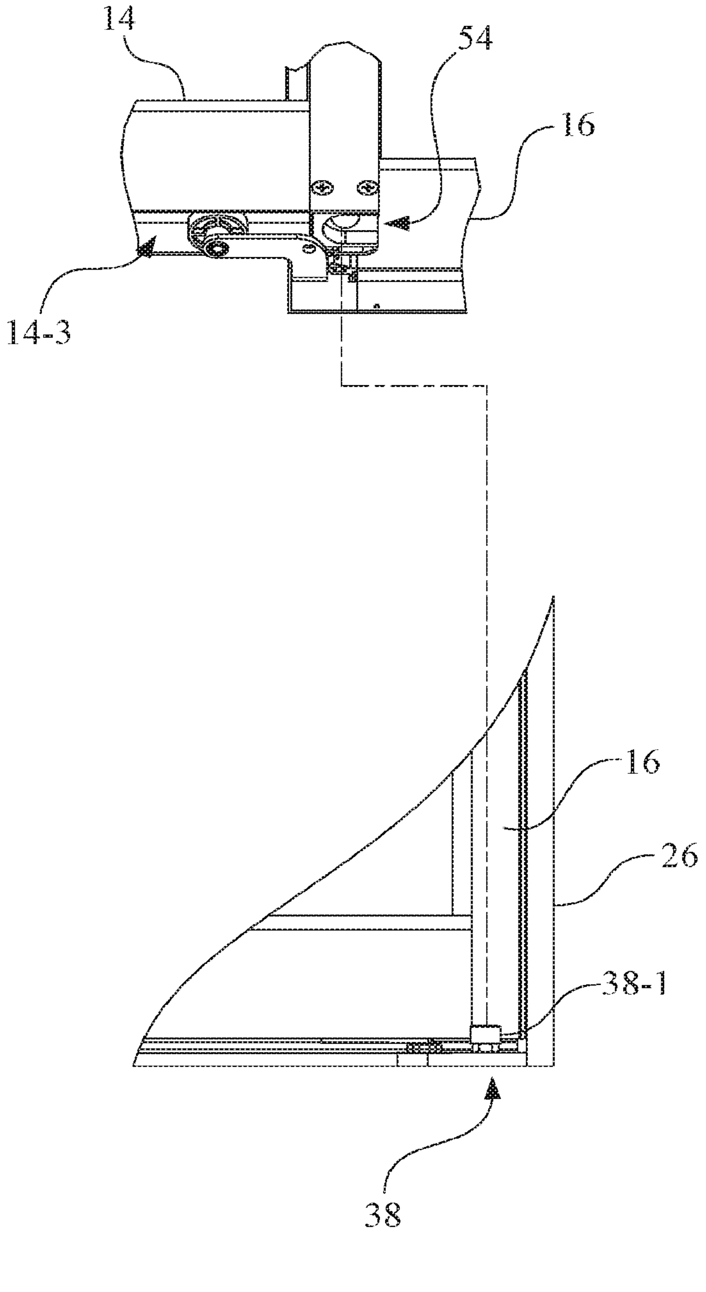
FIG. 5 is an enlarged exploded perspective view of a portion of the door system arranged as in FIG. 3, showing a U-shaped pivot recess of the door panel that slidably engages a lower pivot member, as also shown in FIG. 2, when the door panel is slid to the fully open position depicted in FIG. 3, and also shows the guide system that connects the two door panels together.

Referring to FIGS. 2 and 5, a lower pivot member 38 is fixedly connected, e.g., by mechanical fasteners, such as screws or bolts, to the floor near a lower portion of jamb member 26. Lower pivot member 38 may be configured, for example, as an upwardly extending cylindrical protrusion 38-1 configured to selectively engage door panel 14.

Panel hanger member 18 has a first end portion 18-1 and a second end portion 18-2. Panel hanger member 18 is slidably coupled to header member 22 via at least two roller assemblies 40, 42, each having one or more rollers, e.g., rollers 40-1, 42-1 that ride on support rail 30 of header member 22, as is known in the art. Door panel 14 and door panel 16 are positioned within door frame 12 and staggered in a telescoping manner along longitudinal plane 28.

Panel hanger member 18 and door panel 14 are configured to slide in unison between a closed position 44 (see FIGS. 1 and 2) and a fully open position 46 (see FIGS. 3 and 4) along longitudinal plane 28. In the closed position 44, door panel 14 is positioned adjacent jamb member 24.

Referring to FIG. 2, door panel 14 is coupled to panel hanger member 18 by a coupling mechanism 48. Coupling mechanism 48 includes a latch assembly 50 and an upper pivot mechanism 52. Latch assembly 50 selectively couples door panel 14 to first end portion 18-1 of panel hanger member 18, and upper pivot mechanism 52 pivotably couples door panel 14 to second end portion 18-2 of panel hanger member 18. Accordingly, when latch assembly 50 is in a latched state, door panel 14 and panel hanger member 18 slidably move in unison relative to door frame 12 between the closed position 44 and the fully open position 46. In accordance with an aspect of the present invention, when door panel 14 is in the fully open position 46 (see FIG. 3) and latch assembly 50 is in an unlatched state, door panel 14, as well as door panel 16, may pivot away from longitudinal plane 28.

More particularly, door panel 14 has a handle end portion 14-1 that is releasably coupled to first end portion 18-1 of panel hanger member 18 by latch assembly 50, and has a pivot end portion 14-2 that is pivotably coupled to second end portion 18-2 of panel hanger member 18 by upper pivot mechanism 52. Upper pivot mechanism 52 may be, for example, a hinge. Handle end portion 14-1 of door panel 14 is located adjacent jamb member 24 when door panel 14 is in the closed position 44.

Referring also to FIG. 5, a lower surface 14-3 of pivot end portion 14-2 of door panel 14 has a U-shaped pivot recess 54. U-shaped pivot recess 54 of door panel 14 is engaged with cylindrical protrusion 38-1 of lower pivot member 38 (see also FIGS. 2 and 3) only when door panel 14 is in the fully open position 46. In other words, when door panel 14 is in the fully open position 46, then U-shaped pivot recess 54 of door panel 14 is engaged with cylindrical protrusion 38-1 of lower pivot member 38 and cannot be slid further toward jamb member 26.

Figure 3:
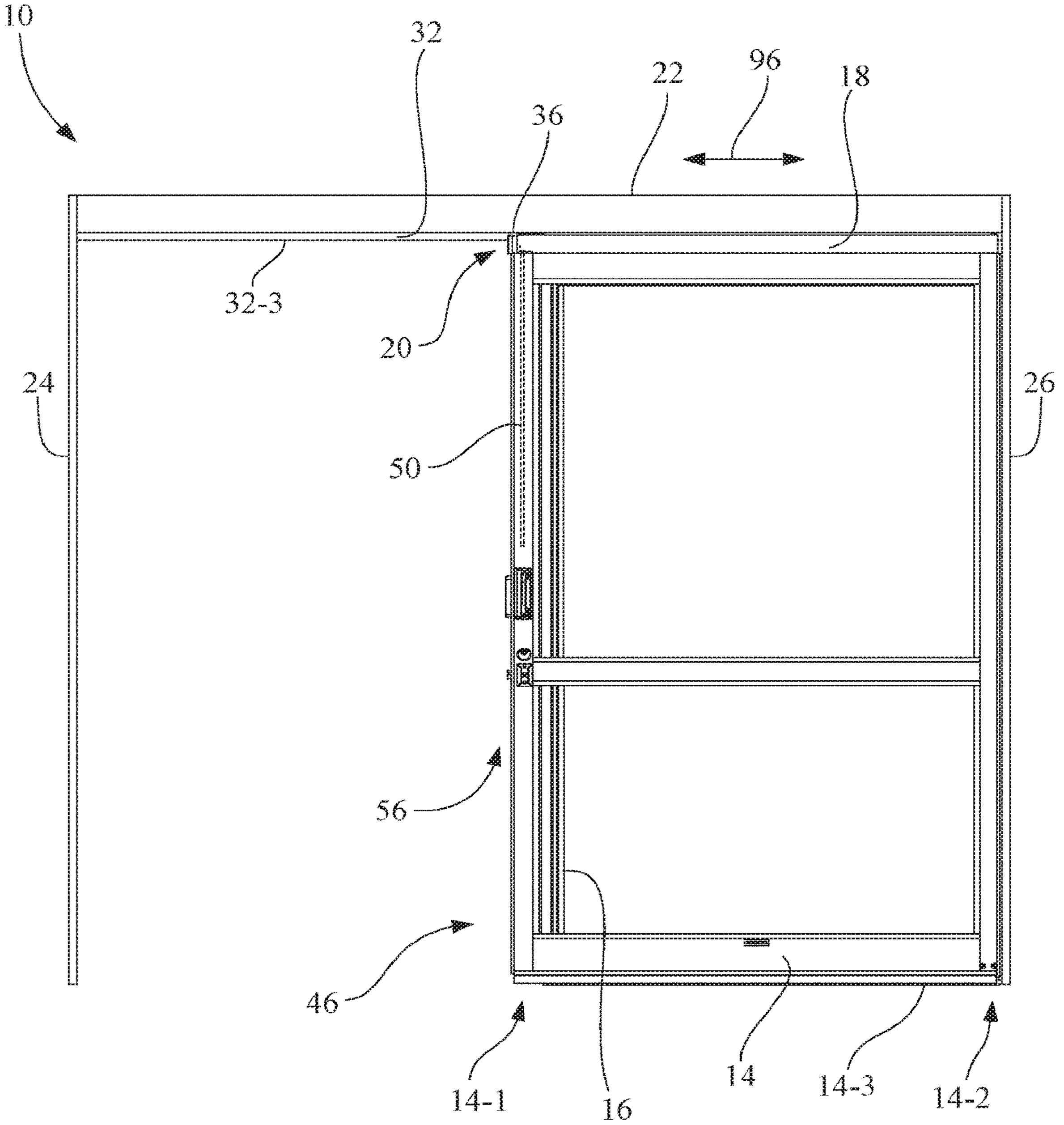
FIG. 3 is an interior side view of the door system of FIG. 1, with the door panel slid to the fully open position.
Figure 6:
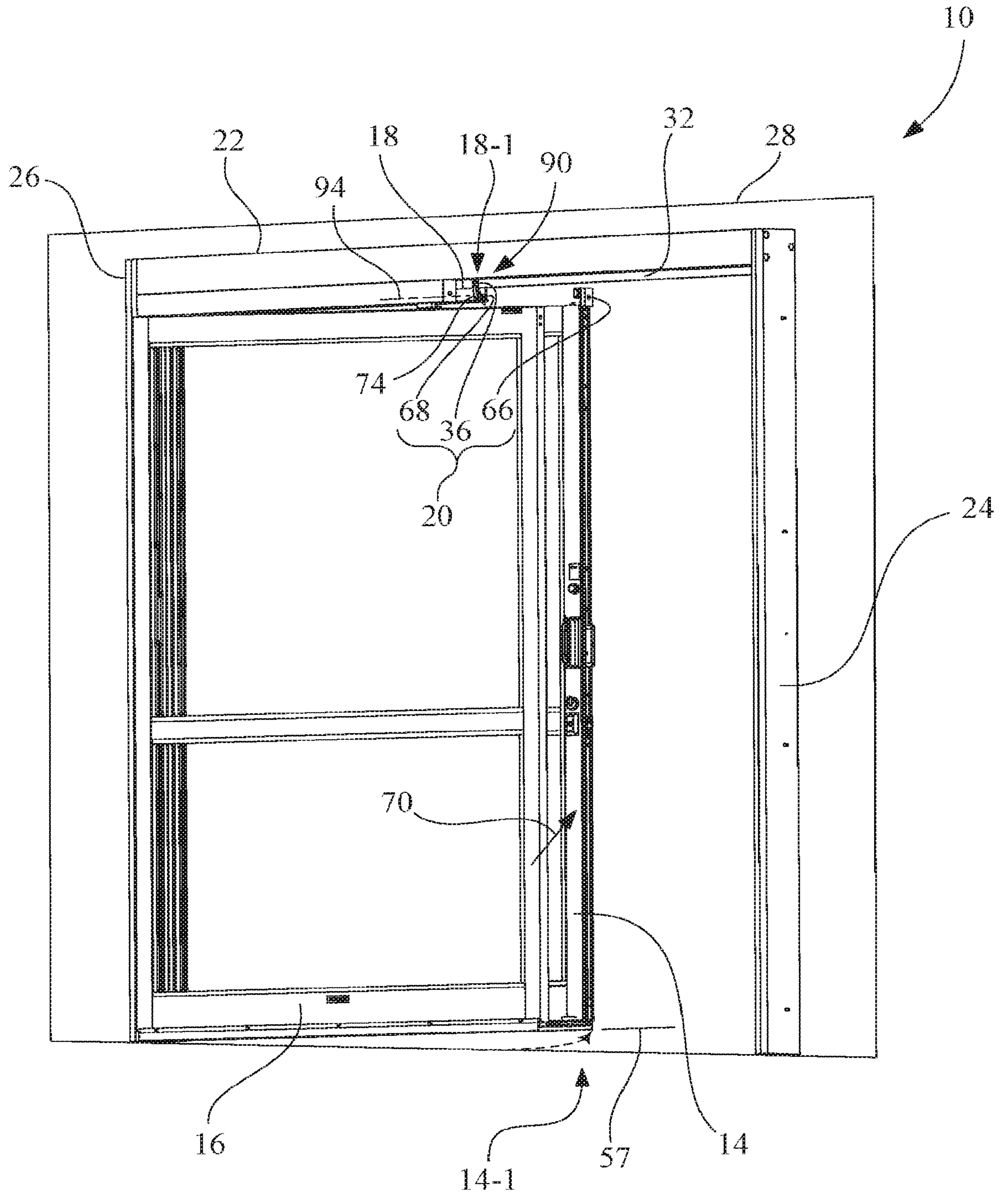
FIG. 6 is a perspective view of the door system depicted in FIG. 3, with a rotating member of the interlock block assembly of FIG. 4 in a slide blocking position, and with the door panel swung away from a plane of the door frame to an intermediate swung open position.

Referring to FIGS. 3 and 4, door panel 14 has a home position 56 (i.e., pivoted closed position, swung shut), wherein when door panel 14 is in home position 56, then door panel 14 is vertically aligned with panel hanger member 18 along the longitudinal plane 28. Prior to door panel 14 has been slid to the fully open position 46 as depicted in FIGS. 3 and 4, swing interlock system 20 prevents door panel 14, and in turn door panel 16, from being swung open, i.e., pivoted away from longitudinal plane 28. However, after door panel 14 has been slid to the fully open position 46 as depicted in FIGS. 3 and 4, door panel 14 may be pivoted out of alignment with panel hanger member 18 and away from longitudinal plane 28, e.g., swung open to a swung open position 57, as depicted in FIG. 6. It is to be understood that the swung open position 57 shown in FIG. 6, and identified also in FIG. 4, is an intermediate position that is between home position 56 and a fully swung open position (not shown). The respective pivot axes of door panel 14 and door panel 16 are offset to facilitate simultaneous pivoting movement of door panel 14 and door panel 16 to the fully swung open position, and in the fully swung open position, each of door panel 14 and door panel 16 may be substantially orthogonal to longitudinal plane 28 of door frame 12.

Referring to FIGS. 1-3, latch assembly 50 is configured to prevent door panel 14 from pivoting relative to panel hanger member 18 until a user activates latch assembly 50 to unlatch door panel 14 from door hanger member 18, thus preventing anyone from accidentally swinging out door panel 14 when door panel 14 is at the fully open position 46 of FIG. 3.

Referring to FIG. 1, latch assembly 50 is mounted to door panel 14, e.g., by mechanical fasteners, and may be partially located within door panel 14. Latch assembly 50 includes an actuator 58, a linkage 60, and a latch bolt 62.

Figure 7A:
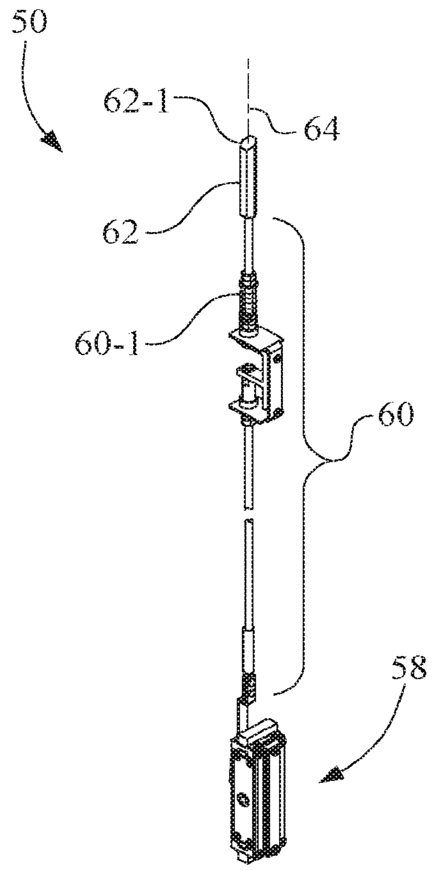
FIG. 7A is a perspective view of a latch assembly of the pivotable and slidable door panel of FIG. 1 that is operable between a latched state to prohibit a pivoting (swinging) of the door panel and an unlatched state to permit a pivoting of the door panel.
Figure 7B:
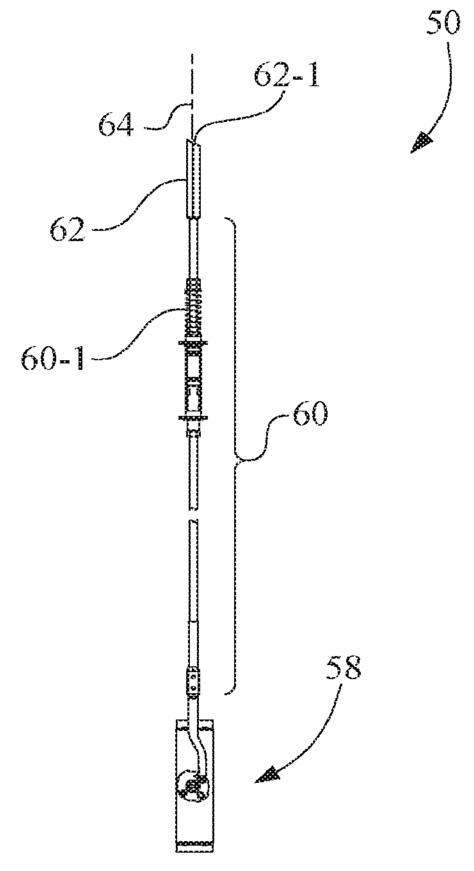
FIG. 7B is a side view of the latch assembly of FIG. 7A, showing the latch bolt with a beveled upper-end surface.

Actuator 58 is operable to move latch bolt 62 between a retracted position and an extended position. Referring also to FIGS. 7A and 7B, actuator 58 may be configured as a linear-to-rotary motion converter having an operator button 58-1 (see FIG. 1). Linkage 60 is operably coupled between actuator 58 and latch bolt 62. Linkage 60 includes a biasing spring 60-1 to bias latch bolt 62 to the extended position. Latch bolt 62 is positioned to move along a substantially vertical axis 64 (see also FIG. 8). As shown in FIGS. 7A and 7B, latch bolt 62 has a beveled end surface 62-1.

Referring to FIGS. 1, 7A, 7B, and 8, when actuator 58 is activated by a user, i.e., by pressing operator button 58-1, latch bolt 62 is moved to the retracted position from the extended position against the biasing force exerted by biasing spring 60-1. More particularly, operator button 58-1 presses upon a rotating disc device of actuator 58, which in turn pulls down latch bolt 62 that is engaged into an underside opening of swing interlock system 20. The rotating disc device is essentially a slider mechanism used to pull down latch bolt 62.

Referring to FIGS. 4, 6 and 8, swing interlock system 20 further includes an interlock plate 66 and an interlock block assembly 68.

Figure 9A:
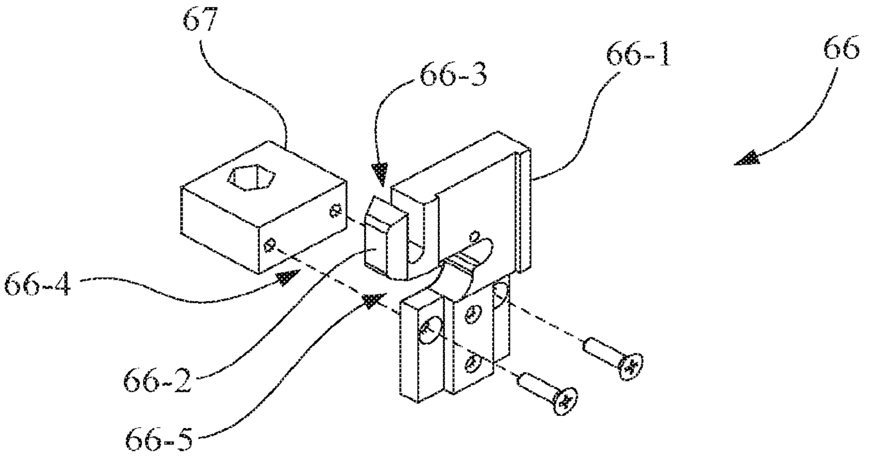
FIG. 9A is a perspective view of the interlock plate of FIG. 4, for attachment to a latch bolt guide of the door panel.
Figure 9B:
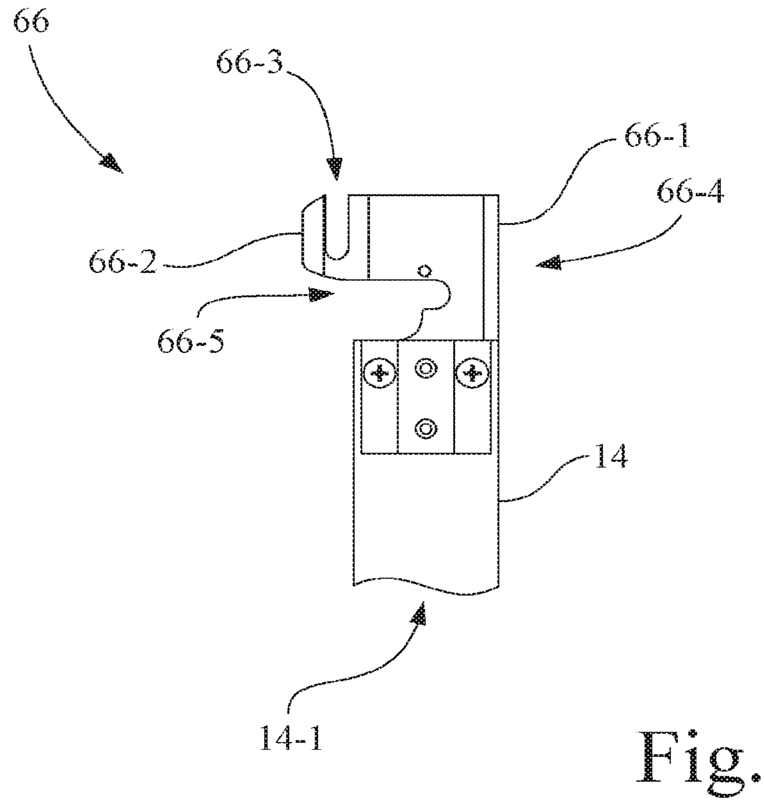
FIG. 9B is a side view of the interlock plate of FIG. 9A.

As best shown in FIGS. 9A and 9B, interlock plate 66 has a leading surface 66-1, a trailing surface 66-2, and a downwardly extending guide slot 66-3. The downwardly extending guide slot 66-3 is in an upper portion 66-4 of interlock plate 66 between leading surface 66-1 and trailing surface 66-2. Trailing surface 66-2 of interlock plate 66 has a detent portion 66-5 that defines a ramp. Interlock plate 66 is mounted to an upper end surface of door panel 14, and may be connected by fasteners to a latch bolt guide 67 of door panel 14.

Interlock plate 66 is fixedly mounted to upper handle end portion 14-1 of door panel 14, e.g., by mechanical fasteners, such as screws, and more particularly, is positioned to extend upwardly from door panel 14, e.g., as a fixed lever arm. Referring again also to FIG. 8, downwardly extending guide slot 66-3 of interlock plate 66 is configured to slidably receive guide rail 32 of header member 22.

Referring to FIGS. 3 and 4, when door panel 14 is in the fully open position 46, interlock plate 66 is aligned with notch 36 of guide rail 32 of header member 22 in a direction 70 orthogonal to the longitudinal plane 28 (see FIG. 6) to facilitate a pivoting of door panel 14 relative to panel hanger member 18 and away from longitudinal plane 28. More particularly, leading surface 66-1 of interlock plate 66 passes into and through notch 36 of guide rail 32 of header member 22 as door panel 14 pivots relative to panel hanger member 18 away from longitudinal plane 28.

Referring to FIG. 6, interlock block assembly 68 is connected to the proximal end of first end portion 18-1 of panel hanger member 18.

Referring to FIGS. 10A-10E, interlock block assembly 68 includes a base block 72, a rotational member 74, a biasing member 76, and a positioning protrusion 78. Interlock block assembly 68 further includes a pair of bushings 80, a shoulder screw 82, a positive stop pin 84, a strike plate 86, and a set screw 88.

In the present embodiment, rotational member 74 is configured as a curved finger member, e.g., a rotatable lever arm, having a mounting end portion 74-1 and a free end portion 74-2.

Bushings 80 are pressed into opposing ends of a horizontal hole 72-1 in base block 72. Shoulder screw 82 passes through bushings 80 and is threadably engaged with mounting end portion 74-1 of rotational member 74 to rotationally couple rotational member 74 to base block 72.

Set screw 88 may be adjusted to position base block 72 within the hanger extrusion of panel hanger member 18. Set screw 88 can be loosened and then the entire interlock block assembly 68 can be slid over to properly align with interlock plate 66. Once the position is determined, set screw 88 is then tightened to keep interlock block assembly 68 in place.

Figure 10A:
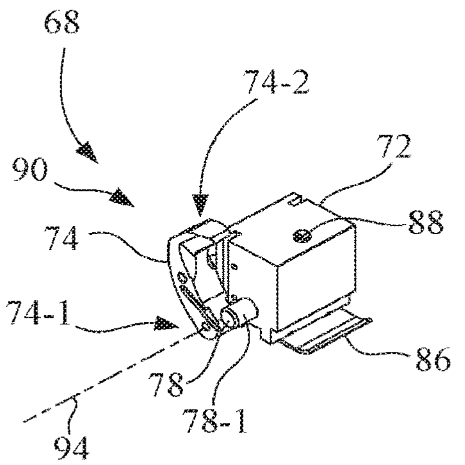
FIG. 10A is a perspective view of the interlock block assembly depicted in FIGS. 4, 6, and 7, with the rotating member of the interlock block assembly in the slide blocking position as also depicted in FIG. 6.
Figure 10B:
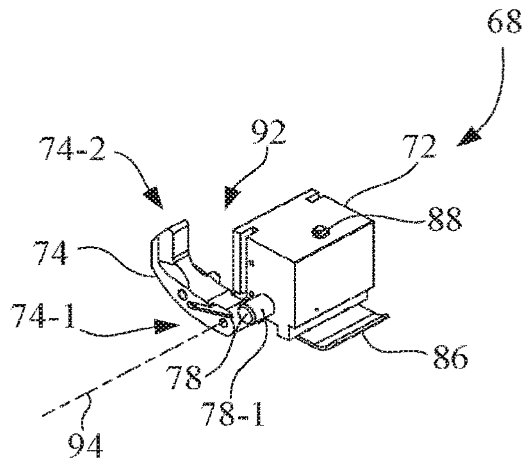
FIG. 10B is a perspective view of the interlock block assembly of FIGS. 4 and 6, with the rotating member of the interlock block assembly in the slide release position depicted in FIGS. 4 and 7.

Biasing member 76 may be in the form of a torsion spring that is interposed between rotational member 74 and base block 72 to rotationally bias rotational member 74 to the upward, slide blocking position 90 depicted in FIG. 10A (see also FIG. 6).

Referring to FIGS. 4, 8, and 10B-10E, rotational member 74 may be pivoted counterclockwise, in the orientation shown, to a slide release position 92 by application of a force by interlock plate 66, as will be described in more detail below.

Figure 10C:
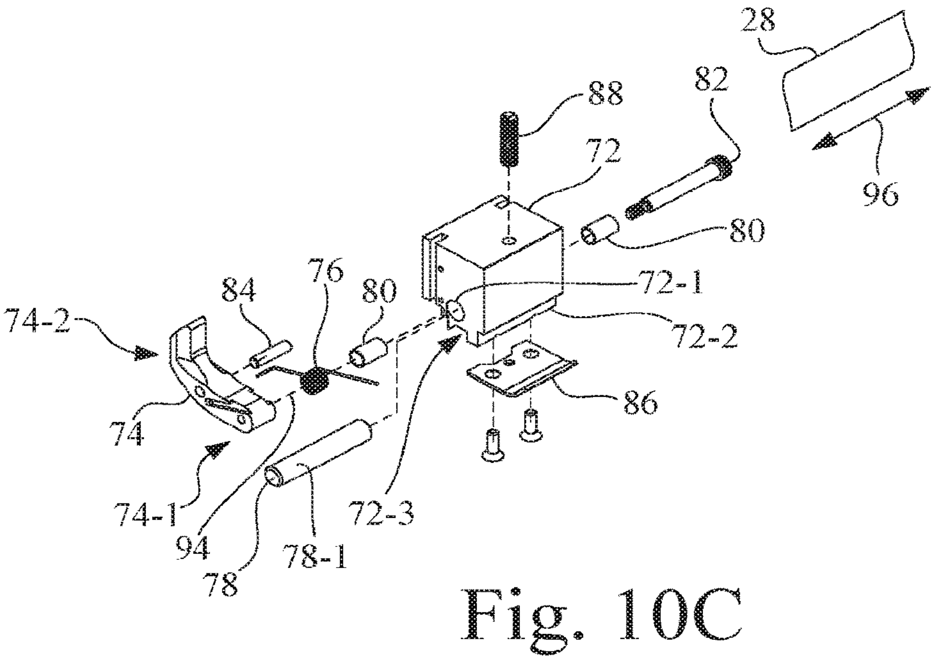
FIG. 10C is an exploded perspective view of the interlock block assembly depicted in FIGS. 10A and 10B.
Figure 10D:
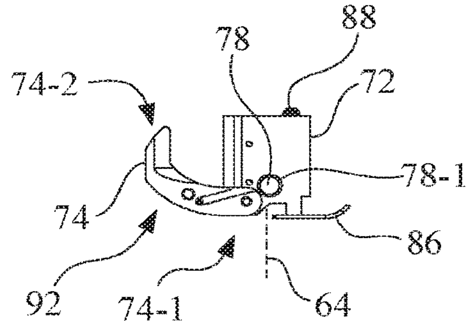
FIG. 10D is a side view of the interlock block assembly arranged as in FIG. 10B, with the rotating member of the interlock block assembly in the slide release position.
Figure 10E:
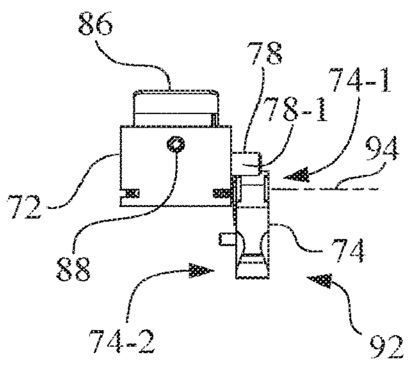
FIG. 10E is a top view of the interlock block assembly of FIG. 10D, with the rotating member of the interlock block assembly in the slide release position.

Referring to FIG. 10C, base block 72 of interlock block assembly 68 has a bottom surface 72-2 having a vertical hole or recess 72-3 that extends upwardly from the bottom surface to receive latch bolt 62 of latch assembly 50 (see also FIGS. 7A and 7B), when door panel 14 is in the home position 56 (see FIGS. 3 and 4). When actuator 58 is activated by a user by pressing operator button 58-1, latch bolt 62 is moved to the retracted position, i.e., disengaging latch bolt 62 from vertical hole 72-3 in base block 72, to facilitate a pivoting of door panel 14 away from the home position 56, as depicted in FIG. 6. Thus, in accordance with an aspect of the present invention, the retraction of latch bolt 62 and the pivoting of door panel 14 is accomplished in a single motion in direction 70 by pushing operator button 58-1.

To reiterate, in order for door panel 14 to be pivoted relative to panel hanger member 18 away from longitudinal plane 28, door panel 14 must be in fully open position 46 depicted in FIGS. 3 and 4, such that interlock plate 66 is aligned with notch 36 of guide rail 32 of header member 22 in direction 70 orthogonal to the longitudinal plane 28, and actuator 58 must be activated by the user, such that latch bolt 62 is moved to the retracted position and out of engagement with vertical hole 72-3 in base block 72 of interlock block assembly 68.

Referring again to FIG. 10C, rotational member 74 of interlock block assembly 68 is pivotably coupled to base block 72 at a pivot axis 94, e.g., by shoulder screw 82. Referring to FIGS. 4 and 6, pivot axis 94 is substantially parallel to the longitudinal plane 28. Rotational member 74 is configured to rotate between slide blocking position 90 (see FIG. 6) and slide release position 92 (see FIG. 4). Referring to FIG. 10A, biasing member 76 is configured to bias rotational member 74 toward slide blocking position 90.

As shown in FIGS. 3 and 4, when door panel 14 is in the fully open position 46 (i.e., slid fully open), rotational member 74 of interlock block assembly 68 is aligned with notch 36 of guide rail 32 of header member 22 in direction 70 orthogonal to the longitudinal plane 28 so as to facilitate a blocking of the sliding of panel hanger member 18 and door panel 14 relative to header member 22 along the longitudinal plane 28. However, rotational member 74 of interlock block assembly 68 does not achieve slide blocking position 90 until door panel 14 is pivoted away from the home position 56, as depicted in FIG. 6, so as to permit rotational member 74 to return to slide blocking position 90 by force exerted by biasing member 76.

Stated differently, with door panel 14 rotational member 74 in the fully open position 46 (i.e., the full open sliding position depicted in FIGS. 3 and 4), as door panel 14 is pivoted away from the longitudinal plane 28, i.e., away from the home position 56 (see FIGS. 3 and 6), rotational member 74 of interlock block assembly 68 rotates clockwise, in the orientation shown, to slide blocking position 90 and into notch 36 of guide rail 32 of header member 22 to prevent a sliding of panel hanger member 18 and door panel 14 relative to header member 22 of door frame 12. The direction of rotation of rotational member 74 is dependent upon the handedness of the door package (i.e. left-hand package vs. a right-hand package).

Also, with rotational member 74 of interlock block assembly 68 in slide blocking position 90, wherein rotational member 74 is positioned in notch 36 of guide rail 32 of header member 22, then door panel 14 has been positioned such that cylindrical protrusion 38-1 of lower pivot member 38 is locked in U-shaped pivot recess 54 of door panel 14 (see FIGS. 2, 3, and 5), so as to prevent a sagging of handle end portion 14-1 of door panel 14 when door panel 14 is pivoted away from the longitudinal plane 28, i.e., pivoted away from the home position 56, as shown in FIG. 6.

Referring again to FIGS. 10A-10E, positioning protrusion 78 of interlock block assembly 68 may be, for example, a dowel pin that extends substantially horizontally from base block 72. Positioning protrusion 78 has a guide surface 78-1 for engaging the detent portion 66-5, e.g., ramp, of the trailing surface 66-2 of interlock plate 66 (see FIGS. 8, 9A and 9B). As door panel 14 is pivoted to the home position 56 (see also FIG. 3), the detent portion 66-5 of the trailing surface 66-2 of interlock plate 66 engages guide surface 78-1 of positioning protrusion 78 of interlock block assembly 68 so as to vertically align door panel 14 with panel hanger member 18 along the longitudinal plane 28 when the door panel 14 reaches the home position 56.

Also, as door panel 14 is pivoted back to the home position 56, the trailing surface 66-2 of the interlock plate 66 (see FIGS. 8, 9A and 9B) is engaged with the rotational member 74 of interlock block assembly 68 to position rotational member 74 in the slide release position 92 (see FIG. 4) when door panel 14 reaches the home position 56. As such, panel hanger member 18, and in turn door panel 14, are no longer blocked by rotational member 74 of interlock block assembly 68 from sliding along longitudinal plane 28.

In addition, as door panel 14 is pivoted back to the home position 56, latch bolt 62 is engaged with vertical hole 72-3 of base block 72 of interlock block assembly 68 to prevent door panel 14 from pivoting relative to panel hanger member 18 away from the home position 56. More particularly, referring to FIGS. 10A-10E, strike plate 86 is attached to a lower surface of base block 72. Beveled end surface 62-1 of latch bolt 62 (see FIGS. 7A and 7B) engages strike plate 86 as door panel 14 is pivoted toward the home position 56 so as to automatically depress latch bolt 62 to facilitate a return-pivoting of door panel 14 to the home position 56, and wherein biasing spring 60-1 moves latch bolt 62 toward the extended position to engage vertical hole 72-3 in base block 72 of interlock block assembly 68 when door panel 14 reaches the home position 56. For example, when door panel 14 returns to home position 56 (see FIG. 3) from a swung open position (see FIG. 6, beveled end surface 62-1 of latch bolt 62 contacts the curved strike plate 86 on base block 72, which depresses latch bolt 62 and which remains depressed until latch bolt 62 is vertically aligned with vertical hole 72-3 of base block 72 of interlock block assembly 68, thus allowing latch bolt 62 of door panel 14 to automatically re-engage and retain door panel 14 in the home position 56.

Thus, in accordance with the present embodiment of the invention, door panel 14 is permitted to pivot away from the home position 56 only when door panel 14 is in the fully open position 46, and when latch bolt 62 is in the retracted position to disengage latch bolt 62 from vertical hole 72-3 of base block 72 of interlock block assembly 68.

As door panel 14 is pivoted hack to the home position 56, latch bolt 62 is engaged with vertical hole 72-3 of base block 72 of interlock block assembly 68 to prevent door panel 14 from pivoting relative to panel hanger member 18 away from the home position 56. Also, as door panel 14 is pivoted back to the home position 56, trailing surface 66-2 of interlock plate 66 passes through notch 36 of header member 22 and into engagement with rotational member 74 of interlock block assembly 68 to position rotational member 74 in the slide release position 92 so as to disengage rotational member 74 from notch 36 in guide rail 32 of header member 22 when door panel 14 reaches the home position 56. In addition, with door panel 14 in the home position 56 (see FIG. 3), the downwardly extending guide slot 66-3 in interlock plate 66 (see FIG. 8) is now re-aligned along guide rail 32 of header member 22 in a direction 96 (see FIG. 3) substantially parallel to the longitudinal plane 28. These events having occurred, door panel 14 may now be slid away from the fully open position 46 depicted in FIG. 3 toward the closed position 44 depicted in FIGS. 1 and 2.

Referring again to FIG. 1, optionally, door system 10 may include a magnetic detent 100 having an upper magnet portion 102 and a lower magnet portion 104. In the present embodiment, upper magnet portion 102 is connected to a distal end 19-1 of panel hanger member 19. Lower magnet portion 104 is attached to an upper distal portion 16-1 of door panel 16. Magnetic detent 100 generates a magnetic attraction force between upper magnet portion 102 and lower magnet portion 104 to aid in holding door panel 16 closed, until a user applies a sufficient force (e.g., shear force) to door panel 16 to overcome the magnetic attraction force. In the present embodiment, upper magnet portion 102 and lower magnet portion 104 are opposite polarity magnets. Also, in the present embodiment, upper magnet portion 102 and lower magnet portion 104 may be opposite polarity permanent magnets.

As used herein, the term "substantially" means the base value in the indicated units (if any) plus or minus two percent. Angular relationships, e.g., parallel, orthogonal, etc., are in the units of degrees, unless otherwise indicated.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A door system, comprising:

a door frame including a header member having a guide rail, the guide having a central portion with a notch that extends upwardly from a lower terminal edge of the guide rail;

a panel hanger member slidably coupled to the header member;

a door panel coupled to the panel hanger member, the door panel having a handle end portion releasably coupled to the panel hanger member and a pivot end portion pivotably coupled to the panel hanger member, the panel hanger member and the door panel configured to slide in unison along the header member between a closed position and a fully open position along a longitudinal plane;

an interlock plate fixedly mounted to the handle end portion of the door panel and positioned to extend upwardly from the door panel, the interlock plate including a guide slot configured to slidably receive the guide rail of the header member, wherein in the fully open position of the door panel, the interlock plate aligns with the notch of the guide rail of the header member in a direction orthogonal to the longitudinal plane to facilitate pivoting of the door panel relative to the panel hanger member away from the longitudinal plane;

a lower pivot member fixedly connected near a lower portion of the door frame, the lower pivot member having an upwardly extending cylindrical protrusion, and the pivot end portion of the door panel having a U-shaped pivot recess, the U-shaped pivot recess being engaged with the cylindrical protrusion of the lower pivot member only when the door panel is in the fully open position; and an interlock block connected to the panel hanger member and configured to rotate between a slide blocking position and a slide release position.

2. The door system of claim 1, wherein the door panel is coupled to the panel hanger member by a coupling mechanism, the coupling mechanism including a latch assembly and an upper pivot mechanism configured such that when the latch mechanism is in a latched state, the door panel and the panel hanger member slidably move in unison relative to the frame between the closed position and the fully open position, and when the door panel is in the fully open position and the latch assembly is in an unlatched state, the door panel is free to pivot away from the longitudinal plane.

3. The door system of claim 1, wherein the interlock plate has a leading surface and a trailing surface, and wherein the leading surface passes into the notch of the guide rail of the header member as the door panel pivots relative to the panel hanger member away from the longitudinal plane.

4. The door system of claim 1, wherein the interlock block includes a rotational member pivotable about a pivot axis that is substantially parallel to the longitudinal plane.

5. The door system of claim 1, wherein in the fully open position of the door panel, the rotational member is aligned with the notch of the guide rail of the header member in a direction orthogonal to the longitudinal plane to block sliding of the panel hanger member and the door panel relative to the header member along the longitudinal plane.

6. A door system, comprising:

a door frame including a header member having a guide rail, the guide having a central portion with a notch that extends upwardly from a lower terminal edge of the guide rail;

a panel hanger member slidably coupled to the header member;

a door panel coupled to the panel hanger member, the door panel having a handle end portion releasably coupled to the panel hanger member and a pivot end portion pivotably coupled to the panel hanger member, the panel hanger member and the door panel configured to slide in unison along the header member between a closed position and a fully open position along a longitudinal plane;

an interlock plate fixedly mounted to the handle end portion of the door panel and positioned to extend upwardly from the door panel, the interlock plate including a guide slot configured to slidably receive the guide rail of the header member, wherein in the fully open position of the door panel, the interlock plate aligns with the notch of the guide rail of the header member in a direction orthogonal to the longitudinal plane to facilitate pivoting of the door panel relative to the panel hanger member away from the longitudinal plane;

a lower pivot member fixedly connected near a lower portion of the door frame, the lower pivot member having an upwardly extending cylindrical protrusion, and the pivot end portion of the door panel having a U-shaped pivot recess, the U-shaped pivot recess being engaged with the cylindrical protrusion of the lower pivot member only when the door panel is in the fully open position; and an interlock block assembly connected to a first end portion of the panel hanger member, the interlock block assembly including a rotational member pivotable about a pivot axis that is substantially parallel to the longitudinal plane, the rotational member being biased to a slide blocking position and configured to rotate between the slide blocking position and a slide release position, wherein in the fully open position of the door panel the rotational member is aligned with the notch of the guide rail of the header member in a direction orthogonal to the longitudinal plane to block sliding of the panel hanger member and the door panel relative to the header member along the longitudinal plane.

7. The door system of claim 6, wherein the rotational member of the interlock block assembly rotates to the slide blocking position and into the notch of the guide rail of the header member to prevent sliding of the panel hanger member and the door panel relative to the header member as the door panel is pivoted away from the longitudinal plane.

8. The door system of claim 6, wherein the door panel is in a home position with the door panel aligned with the panel hanger member along the longitudinal plane, the interlock plate being engaged with the rotational member of the interlock block assembly to position the rotational member in the slide release position with the door panel in the home position.

9. The door system of claim 6, wherein the interlock block assembly further includes a positioning protrusion having a guide surface and the interlock plate has a trailing surface with a detent portion, wherein the detent portion of the trailing surface engages the guide surface as the door panel is pivoted to the home position to vertically align the door panel with the panel hanger member along the longitudinal plane with the door panel in the home position.

10. The door system of claim 6, comprising:

a latch assembly mounted to the door panel, the latch assembly including an actuator, a linkage, and a latch bolt, the linkage being operably coupled between the actuator and the latch bolt, the latch bolt moveable along a substantially vertical axis; and the interlock block assembly includes a base block having a bottom surface and a recess that extends upwardly at the bottom surface to receive the latch bolt with the door panel in a home position.

11. The door system of claim 10, wherein the actuator is operable to move the latch bolt between a retracted position and an extended position, and wherein with the door panel in the home position and the latch bolt in the extended position, the latch bolt is engaged with the recess of the base block of the interlock block assembly to prevent the door panel from pivoting relative to the panel hanger member away from the home position.

12. The door system of claim 11, wherein the linkage includes a biasing spring, and wherein the latch bolt is biased to the extended position by the biasing spring, wherein the latch bolt is moved to the retracted position to facilitate a pivoting of the door panel away from the home position.

13. The door system of claim 12, wherein the door panel is permitted to pivot away from the home position only when the door panel and panel hanger member is in the fully open position and when the latch bolt is in the retracted position to disengage the latch bolt from the recess in the base block of the interlock block assembly.

14. The door system of claim 13, wherein the latch bolt has a beveled surface that engages a strike plate attached to the base block of the interlock block assembly as the door panel is pivoted toward the home position so as to automatically depress the latch bolt to facilitate a return-pivoting of the door panel to the home position, and wherein the biasing spring moves the latch bolt toward the extended position to engage the recess in the base block of the interlock block assembly when the door panel reaches the home position.

15. A door system, comprising:

a door frame including a header member having a guide rail, the guide rail having a central portion and a lower terminal edge extending along the central portion, the guide rail including a notch that extends upwardly from the lower terminal edge;

a panel hanger member slidably coupled to the header member, the panel hanger member having a first end portion;

a door panel coupled to the panel hanger member, the door panel having a handle end portion releasably coupled to the panel hanger member and a pivot end portion pivotably coupled to the panel hanger member, the panel hanger member and the door panel configured to slide in unison between a closed position and a fully open position along a longitudinal plane; and an interlock plate fixedly mounted to the handle end portion and positioned to extend upwardly from the door panel, the interlock plate including a guide slot configured to slidably receive the guide rail of the header member, wherein in the fully open position the interlock plate is aligned with the notch of the guide rail of the header member in a direction orthogonal to the longitudinal plane to facilitate a pivoting of the door panel relative to the panel hanger member away from the longitudinal plane; and an interlock block assembly connected to the first end portion of the panel hanger member, the interlock block assembly including a rotational member being pivotable about a pivot axis that is substantially parallel to the longitudinal plane, the rotational member being rotationally biased toward a slide blocking position and configured to rotate between the slide blocking position and a slide release position, wherein in the fully open position the rotational member is aligned with the notch of the guide rail of the header member in a direction orthogonal to the longitudinal plane to block sliding of the panel hanger member and the door panel relative to the header member along the longitudinal plane.

16. The door system of claim 15, wherein:

the interlock plate has a leading surface and a trailing surface, and wherein the leading surface passes into the notch of the guide rail of the header member as the door panel pivots relative to the panel hanger member away from the longitudinal plane; and the rotational member of the interlock block assembly rotates to the slide blocking position and into the notch of the guide rail of the header member to prevent a sliding of the panel hanger member and the door panel relative to the header member as the door panel is pivoted away from the longitudinal plane.

17. The door system of claim 15, further comprising:

a fixed panel hanger member fixedly attached to the door frame, the fixed panel hanger member having a distal end portion;

a second door panel pivotably coupled to the door frame and the fixed panel hanger member, the second door panel having an upper distal portion; and a magnetic detent having an upper magnet portion and a lower magnet portion, the upper magnet portion being attached to the distal end of the fixed panel hanger member and the lower magnet portion being attached to the upper distal portion of the second door panel.

18. The door system of claim 15, wherein the interlock block assembly includes a base block and a biasing member, the rotational member being pivotably coupled to the base block, and the biasing member is configured to bias the rotational member toward the slide blocking position.

19. The door system of claim 15, comprising:

a latch assembly mounted to the door panel, the latch assembly including an actuator, a linkage, and a latch bolt, the linkage being operably coupled between the actuator and the latch bolt, the latch bolt moveable along a substantially vertical axis; and the interlock block assembly includes a base block having a bottom surface and a recess that extends upwardly at the bottom surface to receive the latch bolt with the door panel in the home position.

20. A door system, comprising:

a door frame including a header member having a guide rail, the guide rail having a front surface, a rear surface, and a lower terminal edge, the guide rail having a central portion that has a notch that extends upwardly from the lower terminal edge between the front surface and the rear surface;

a panel hanger member slidably coupled to the header member;

a first door panel coupled to the panel hanger member, the first door panel having a handle end portion releasably coupled to the panel hanger member and a pivot end portion pivotably coupled to the panel hanger member, the panel hanger member and the first door panel configured to slide in unison between a closed position and a fully open position along a longitudinal plane;

an interlock plate fixedly mounted to the handle end portion and positioned to extend upwardly from the first door panel, the interlock plate including an extending guide slot configured to slidably receive the guide rail of the header member, wherein in the fully open position of the first door panel, the interlock plate is aligned with the notch of the guide rail of the header member in a direction orthogonal to the longitudinal plane to facilitate a pivoting of the first door panel relative to the panel hanger member away from the longitudinal plane;

a fixed panel hanger member fixedly attached to the door frame, the fixed panel hanger member having a distal end portion;

a second door panel pivotably coupled to the door frame and the fixed panel hanger member, the second door panel having an upper distal portion; and a magnetic detent having an upper magnet portion and a lower magnet portion, the upper magnet portion being attached to the distal end of the fixed panel hanger member and the lower magnet portion being attached to the upper distal portion of the second door panel.

21. The door system of claim 20, wherein the frame further includes a first jamb member and a second jamb member spaced from the first jamb member, and wherein the header member extends between the first jamb member and the second jamb member, the handle end portion of the door panel being located adjacent the first jamb member when the door panel is in the closed position.

22. The door system of claim 21, wherein the pivot end portion is pivotably coupled to the panel hanger member by an upper pivot mechanism, and further comprising a lower pivot member fixed near a lower portion of the second jamb member, the lower pivot member having an upwardly extending cylindrical protrusion, and the pivot end portion of the door panel having a U-shaped pivot recess, the U-shaped pivot recess being engaged with the cylindrical protrusion of the lower pivot member only with the door panel in the fully open position.

* * * * *